No. 698,460. Patented Apr. 29, 1902.
J. CRAWFORD.
SEWER TRAP.
(Application filed July 15, 1901.)
(No Model.) 2 Sheets—Sheet 1.
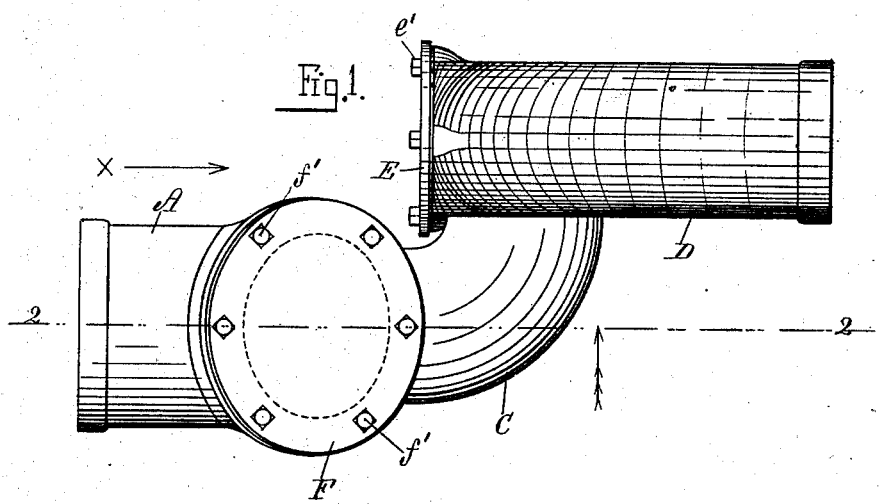
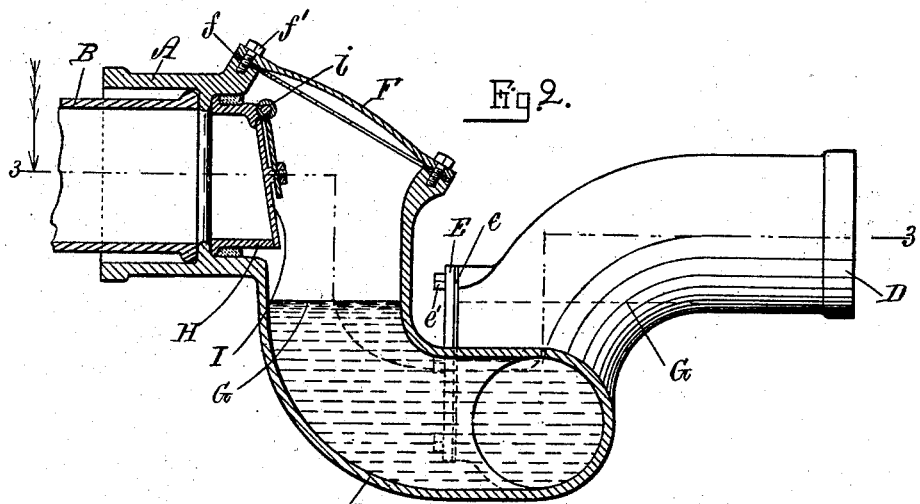
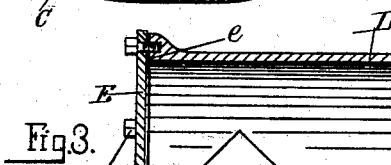
Witnesses
L. N. Möller
C. S. Barker
Inventor
James Crawford
by
/s/ Van Andren, his atty.
THE NORRIS PETERS CO., PHOTO-LITHO., WASHINGTON, D. C.

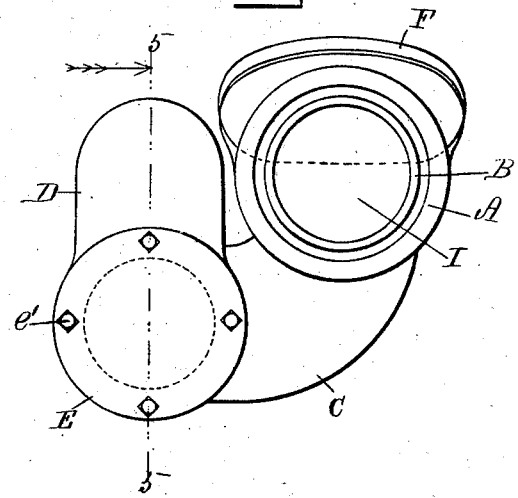
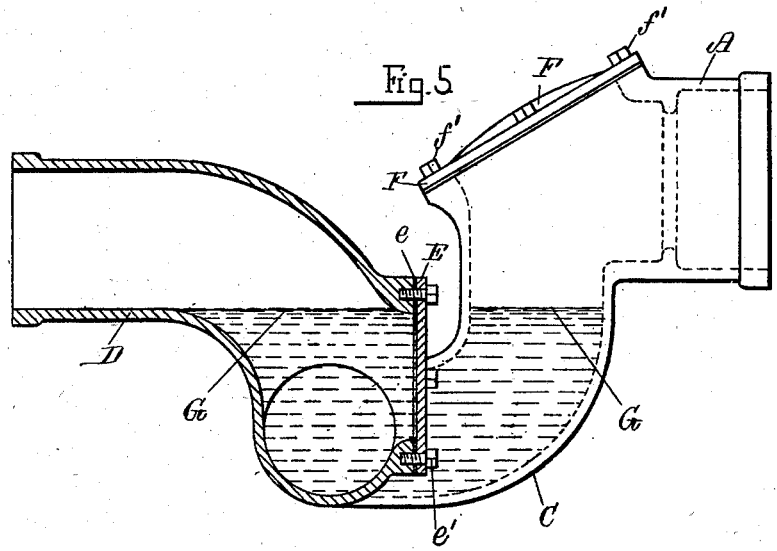

UNITED STATES PATENT OFFICE.

JAMES CRAWFORD, OF BOSTON, MASSACHUSETTS.

SEWER-TRAP.

SPECIFICATION forming part of Letters Patent No. 698,460, dated April 29, 1902.

Application filed July 15, 1901. Serial No. 68,289. (No model.)

*To all whom it may concern:*

Be it known that I, JAMES CRAWFORD, a citizen of the United States, residing at Boston, in the county of Suffolk and State of Massachusetts, have invented new and useful Improvements in Sewer-Traps, of which the following is a specification.

This invention relates to improvements in sewer-traps; and it is constructed so as to be readily accessible for cleansing purposes in case the delivery-pipe from the house to the sewer should become clogged on either side of the trap, and it is so constructed and arranged as to cause the removable cover on the sewer end portion of the trap to be normally sealed by the liquid in such trap portion, thus preventing foul odors or gases from entering the house connected to the sewer.

The invention is carried out as follows, reference being had to the accompanying drawings, wherein—

Figure 1 represents a top plan view of my improved sewer-trap. Fig. 2 represents a longitudinal section on the line 2 2 shown in Fig. 1. Fig. 3 represents a longitudinal section on the broken line 3 3 shown in Fig. 2. Fig. 4 represents an end view seen from X in Fig. 1, and Fig. 5 represents a vertical section on the line 5 5 shown in Fig. 4.

Similar letters refer to similar parts wherever they occur on the different parts of the drawings.

In the drawings, A represents the preferably socketed end of the device, to which is suitably connected the house drain-pipe B, as shown in Figs. 2 and 3. Said socketed portion A is made integral with a downwardly-projecting trap-pipe C, the lower end of which is made integral with a delivery-pipe D, which is connected in any well-known manner to the sewer-pipe leading to the sewer in the street. The said delivery-pipe D is located to one side of the trap-pipe C, as shown in the drawings, and is provided at its open inner end with a removable cover E, which is secured water-tight to the inner end of the pipe D by a packing-ring $e$ and fastening-bolts $e'$ $e'$, as shown in the drawings.

The upper end of the trap-pipe C is provided with a removable cover F, which is secured water-tight to said upper open end of pipe C by means of a packing $f$ and fastening-bolts $f'$ $f'$, as shown.

By the construction as above described the device is readily accessible for cleansing purposes. If the house end of the drain-pipe should become clogged, it is only necessary to remove the cover F, so as to permit the introduction of a rod, wire, hose, &c., through the socketed end, by means of which such house portion of the drain-pipe can readily be cleansed and obstacles removed.

Should the delivery portion D and its connection to the street-sewer become clogged, it is only necessary to remove the cover E, when a rod, wire, or hose may be put through the pipe D for the purpose of cleansing it and removing obstructions therein.

G in Figs. 2 and 5 represents the normal level of the liquid in the trap-pipe portions C and D. Such liquid in the lower portion of the latter serves to form a liquid seal relative to the opening covered by the cover E, thus preventing any escape of sewer-gas at the junction of said cover and inner end of the said pipe portion D.

For the purpose of preventing back-water pressure from the main sewer into the house portion of the drain-pipe I may prefer to locate within the inner portion of the socketed end A an annular valve-case H, upon which is seated a gravity-valve I, pivoted at $i$ to the upper end of said valve-case, as shown in Figs. 2 and 3. If such back-water-pressure valve is needed, it may readily be secured in position in any suitable manner simply by removing the cover F and inserting it through the opening normally covered by said cover.

What I wish to secure by Letters Patent and claim is—

The herein-described sewer-trap, consisting of a pipe having in one end means for connecting it to the house-drain, a removable cover on said house end portion, a downwardly and laterally projecting trap-pipe leading to the sewer end of the trap, the latter being arranged at one side of the house end portion and provided with a removable liquid-sealed cover substantially as and for the purpose set forth.

In testimony whereof I have hereunto set my hand in presence of two subscribing witnesses.

JAMES CRAWFORD.

Witnesses:
 ALBAN ANDRÉN,
 LAURITZ NELSON MÖLLER.